May 17, 1932.  P. A. NEUMANN  1,858,412

TRACTION PROMOTING ACCESSORY FOR AUTOMOBILES

Filed March 19, 1931

Paul A. Neumann INVENTOR.

Patented May 17, 1932

1,858,412

UNITED STATES PATENT OFFICE

PAUL A. NEUMANN, OF CHICAGO, ILLINOIS

TRACTION PROMOTING ACCESSORY FOR AUTOMOBILES

Application filed March 19, 1931. Serial No. 523,736.

The invention relates to improvements in traction promoting accessories for automobiles, and the objects of the improvements are, first, to provide an attachment to the wheel which will keep it from spinning around in mud, snow or on ice; second, to afford facilities for the easy and rapid fastening of such attachment to the wheel; and third, to provide a tire chain which can be attached without having to move or to lift the car.

Figure 1:
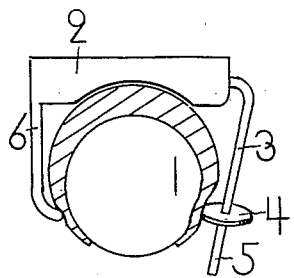
Figure 2:
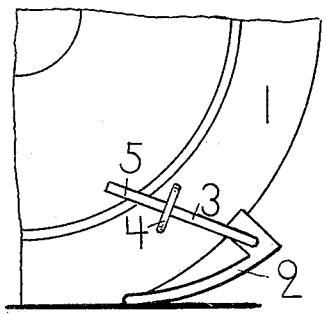
Figure 5:
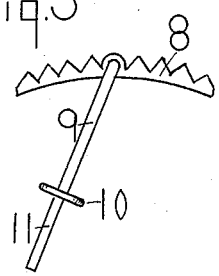
Figure 3:
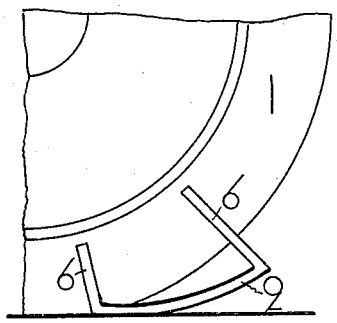
Figure 4:
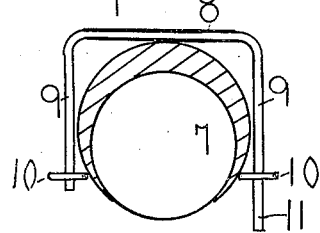
Figure 6:
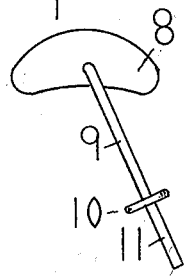
Figure 7:
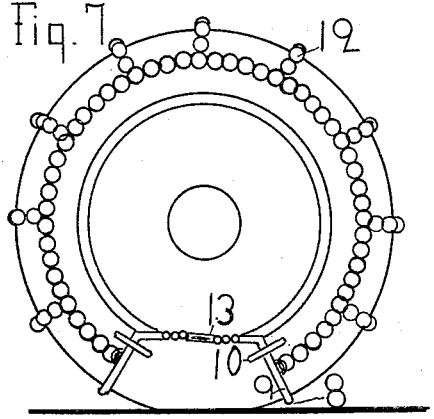
Figure 8:
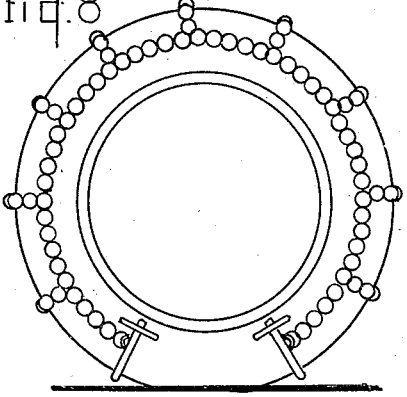

The invention is illustrated in the accompanying drawings in which Fig. 1 shows a section through a tire with the accessory mounted thereon. Fig. 2 shows a side view of a quarter of a wheel with the accessory mounted thereon seen from the outside of the car. Fig. 3 shows a side view of the same seen from the other side. Fig. 4 shows a section through a tire with a different form of the accessory mounted thereon. Fig. 5 and and Fig. 6 show side views of the same form of the accessory, but with different traction promoting bodies, detached from the tire. Fig. 7 and Fig. 8 show side views of opposite sides of a wheel with the same form of the accessory in combination with a tire chain mounted thereon.

In Figs. 1, 2 and 3, 1 is the tire. 2 is a traction promoting body fitting the periphery of the tire 1. 3 is a member revolvably attached to the traction promoting body 2. The member 3 is provided with a revolvable round body 4, in this case a disc. 5 is a prolongation of the member 3 beyond the disc 4 and serves merely as a handle. 6 are members attached to the traction promoting body 2 and extending therefrom over the inner side of the tire 1. The ends of these members 6 are preferably bent inwards towards the tire 1 so that they grip the tire 1 near the rim when the accessory is mounted. The members 6 may be rigidly or revolvably attached to the traction promoting body 2.

In Figs. 4, 5 and 6 there is again a traction promoting body 8. 9 are members attached to the traction promoting body 8 and these members are provided with revolvable round bodies 10, also discs. A prolongation 11 of one of the two members 9 serves as a handle. In Fig. 4 the two members 9 are rigidly connected the one with the other and the connection forms the traction promoting body 8, the whole accessory taking the form of a U-shaped clamp. In Figs. 5 and 6 special traction promoting bodies 8 are provided to which the members 9 are revolvably attached. But here also the members 9 are rigidly connected the one with the other. Fig. 7 shows a tire chain 12 not covering the entire circumference of the tire. At each end of the chain 12 a U-shaped clamp as shown in Fig. 4 is attached, these clamps consisting of the traction promoting bodies 8 rigidly connecting the members 9 which are provided with the discs 10. On the outer side of the wheel the two clamps are connected by any connecting means as, for instance, two short pieces of chain with a chain lock. Fig. 8 shows the same wheel seen from the inner side where the two clamps are not connected.

The accessories as shown in Figs. 1 to 6 are attached to the wheel by putting the traction promoting body on the top of the tire, and by then swinging the member attached thereto on the outer side of the tire downwards to a position radial to the wheel. In the form of the accessory shown in Figs. 1 to 3 the disc 4, in being forcibly roled over the tire, will compress it. Arrived at the final position, radial to the wheel, the member 3 will stand with its disc 4 bearing against the tire near the rim. On the other side of the tire the members 6 are pressed against the tire, their inwardly bent ends also gripping the tire near the rim. In this position the discs 4 offer strong resistance to a radial pull over the tire, and therefore, by the member 3 they will keep the traction promoting body on the tire. The accessory can easily be detached from the tire by swinging the member 3 back and thereby rolling the discs 4 off the tire.

The accessory is now firmly attached to the tire and revolves with it. When the traction promoting body 2 strikes the ground it is thereby retarded and the tire has the tendency to slip in the accessory. To avoid this it is preferable to attach the member 3 in such way to the traction promoting body 2 that it does not revolve in a vertical plane but that its plane of revolution is inclined towards the tire and also somewhat inclined in the sense of the revolution of the wheel. This is shown in Figs. 1 and 2. Thereby, when the traction promoting body 2 is retarded by striking the ground and when the disc 4 by friction with the tire is taken along, the disc 4 is automatically pressed against the tire till the tire cannot slip any more through the accessory but carries it along.

The form of the accessory shown in Figs. 4 to 6 only differs from the one shown in Figs. 1 to 3 inasmuch as discs 10 are provided which, in attaching the accessory, are forcibly rolled not only over the outer side of the tire but over opposite sides of it. The two members 9 carrying the discs 10 are rigidly connected the one with the other so that they can be swung over the tire together by means of the handle 11 from the outer side of the tire. Fig. 4 shows how the connection between the two members 9 serves as a traction promoting body 8, no special traction promoting body being provided. In this case the accessory takes the form of a U-shaped clamp provided with discs at its ends. In Fig. 5 the traction promoting body is a flat toothed iron, in Fig. 6 it is a rounded body giving a strong lifting effect. For different cars and purposes it may be of widely different shape. It is not the form or shape of the traction promoting body what I consider the essence of my invention but the way of attaching it to the wheel. Also, the revolvable round bodies provided for the members 3 and 9 need not be discs but may be balls or rolls or cones.

When a car is stuck in a mudhole, or in snow or on an inclined icy road, the wheels spin around finding no resistance. In such situations it is, as a rule, not possible to apply chains. My device, however, can be easily and rapidly attached, also to disc wheels. The forms of the accessory shown in Figs. 1 to 6 will, as a rule, be taken off the wheel once the car has overcome the obstacle. In Figs. 7 and 8 I show a combination of the form shown in Fig. 4 with a tire chain. By this combination I provide a tire chain which can be mounted without having to move or to lift the car. It is mounted by putting the chain 12 on top of the tire so that both ends hang down. The chain 12 is not long enough to cover the entire circumference of the tire, so that the U-shaped clamps attached to the ends of the chain can be rolled over the tire without moving or lifting the car.

The two clamps are then connected the one with the other on the outer side of the wheel only where they are easily accessible. They may be connected in any suitable way, as for instance by a chain lock or a spring, or they may simply be hooked together. No connection is needed on the inside of the wheel. It is obvious that a chain of this type offers great advantages as it can be mounted even when the car is stuck in a mudhole, in snow or on ice.

I claim:

1. In traction promoting accessories for automobiles the combination of a traction promoting body fitting the periphery of a tire, a member attached to the traction promoting body and provided with revolvable round bodies adapted to be rolled over the outer side of the tire and to grip it near the rim, and members attached to the traction promoting body and adapted to be pressed against the inner side of the tire near the rim.

2. In traction promoting accessories for automobiles the combination of a traction promoting body fitting the periphery of a tire, and members attached to the traction promoting body and provided with revolvable round bodies adapted to be rolled over opposite sides of the tire and to grip them near the rim.

3. In traction promoting accessories for automobiles a plurality of U-shaped clamps adapted to be attached to the periphery of a tire, the clamps being provided with revolvable round bodies adapted to be rolled over opposite sides of the tire and to grip them near the rim, and a flexible traction promoting member connecting the clamps.

4. In traction promoting accessories for automobiles the combination of a tire chain not covering the entire circumference of the tire, a U-shaped clamp at each end of the chain, the clamps being provided with revolvable round bodies adapted to be rolled over opposite sides of the tire and to grip them near the rim, and means to connect the clamps on the outer side of the tire.

PAUL A. NEUMANN.